United States Patent [19]

Kay

[11] 3,817,561

[45] June 18, 1974

[54] PIPE JOINT CONNECTOR
[75] Inventor: Francis Xavier Kay, Winslow, England
[73] Assignee: Instruments and Movements Limited, London, England
[22] Filed: Dec. 8, 1971
[21] Appl. No.: 205,953

[30] Foreign Application Priority Data
Dec. 31, 1970   Great Britain.................... 62089/70

[52] U.S. Cl.................. 285/177, 285/259, 285/345
[51] Int. Cl............................................. F16l 25/00
[58] Field of Search ........... 285/177, 382, 238, 240, 285/259, 345, 340, 423; 287/126

[56] References Cited
UNITED STATES PATENTS

| 561,441 | 6/1896 | Schmidt.......................... 285/238 X |
| 2,021,745 | 11/1935 | Pfefferle et al. ..................... 285/340 |
| 2,474,880 | 7/1949 | Woodling....................... 285/340 X |
| 3,637,240 | 1/1972 | Meier................................ 285/238 |
| 3,679,241 | 7/1972 | Hoffmann........................... 285/340 |
| 3,695,643 | 5/1970 | Schmunk....................... 285/423 X |

FOREIGN PATENTS OR APPLICATIONS
705,031   3/1965   Canada.............................. 285/238

Primary Examiner—James R. Boler
Assistant Examiner—Wayne L. Shedd
Attorney, Agent, or Firm—Parmalee, Miller, Welsh & Kratz

[57] ABSTRACT

A pipe joint, especially for pipes of soft or resilient, e.g. plastics, material and in the sizes used in fluidics systems, comprises a connector body having an orifice sized to receive a pipe to be connected thereto and, internally, two or more sharp-edged ribs one of which is interrupted to provide a ring of teeth, the entry face of each rib being ramped and extending from a diameter, at the rib edge, less than the nominal external diameter of the pipe to a diameter greater than the nominal external diameter of the pipe. The body may have two or more pairs or sets of ribs sized to suit pipes of respectively different nominal external diameter.

7 Claims, 4 Drawing Figures

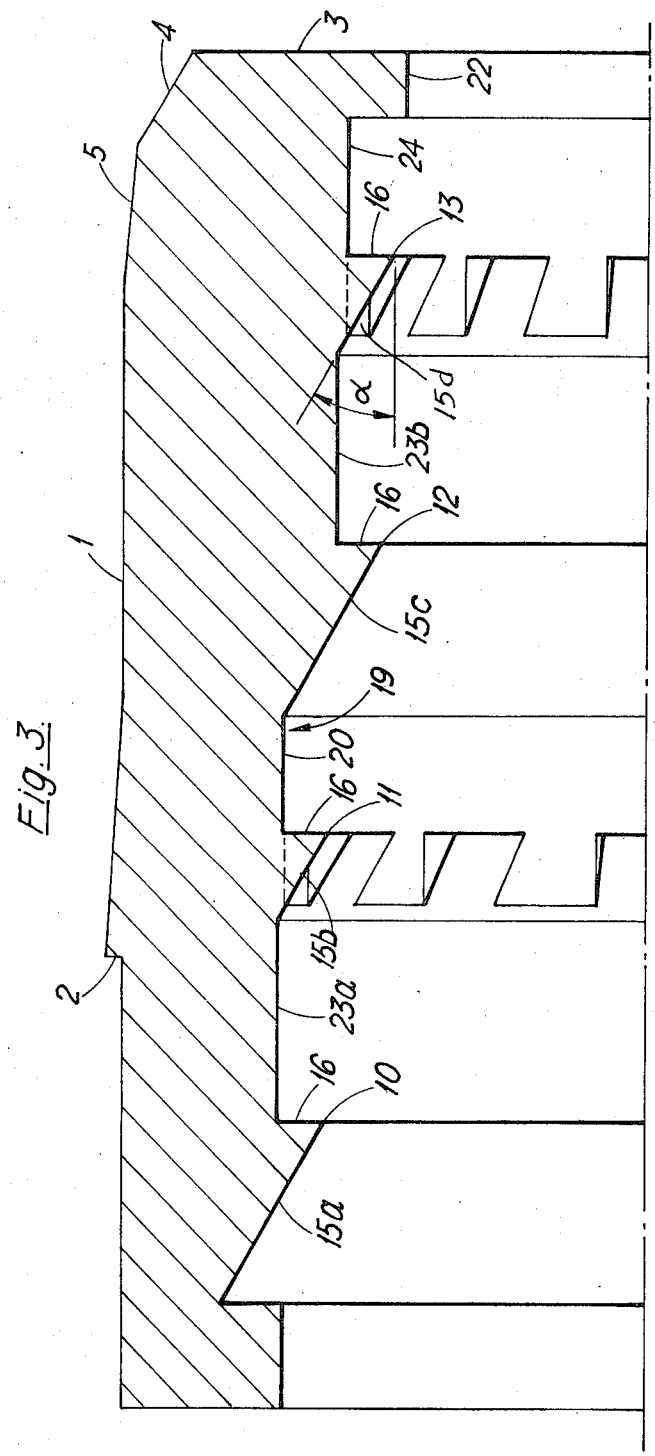

PIPE JOINT CONNECTOR

BACKGROUND AND BRIEF DESCRIPTIONS OF INVENTION

The invention concerns pipe joints and in particular relates to the connection of flexible pipes, tubes or hoses (all called "pipes" herein for convenience) to a connector body that may, for instance, be an integral part of an apparatus or mechanism requiring a fluid-passing connection to such a pipe, or which may be adapted for connection to two such pipes to provide for the interconnection thereof.

The invention is more especially concerned with the connection of flexible pipes of relatively soft or resilient material, for instance rubber or a plastics material such as polyethylene, to a connector body and although the invention is generally applicable to pipes of a wide range of sizes, e.g. ranging up to two or three inches nominal external diameter (OD), the invention is more especially applicable to pipes of relatively small sizes, for instance having an OD of about one-half inch or less.

The art is replete with proposals for pipe joints that comprise a connector body having one or more internal ribs having a profile corresponding to a saw-tooth cross section and adapted to dig into the outer surface of a pipe inserted into the body, so as thereby to grip the pipe and to accomplish a seal thereon. However, the proposed arrangements show various disadvantages in practice and have not, for this reason, enjoyed widespread adoption. Thus, for instance, there have been problems due to inadequate sealing and due to inadequate retention of a pipe in the connector body and, in addition, problems due to lack of tolerance to variations in pipe size and bore concentricity, especially in the case of pipe joints for the smaller sizes of pipe.

An objective of the present invention is therefore to provide a pipe joint arrangement that may be readily fabricated and which will provide for a satisfactory connection with any one of a set of pipes differing from one another in material of construction and/or in size due to manufacturing tolerances. More particularly, an objective is to provide for the rapid interconnection of components of so-called "fluidic" systems by means of the relatively small sized pipes customarily employed therein, thereby to reduce the overall cost of such systems and to simplify their setting up and their adjustment and modification to suit changing requirements.

In accordance with the invention, a pipe joint comprises a connector body having an orifice sized to receive a pipe to be connected thereto, said orifice being formed internally with at least two sharp-edged circumferential ribs each defining an aperture having a diameter less than the nominal external diameter of the pipe to be recieved in said orifice, each rib having, on the side facing the entry to said orifice, a ramped divergent surface extending to a diameter greater than the said nominal external diameter of the pipe, and one of said ribs being interrupted circumferentially.

Preferably the circumferentially interrupted or discontinuous rib is disposed further from the entry to the connector body than the other, continuous, rib or ribs therein.

Preferably the discontinuous rib defines an aperture having a smaller diameter than the aperture or apertures defined by the continuous rib or ribs, thereby to provide for a substantial degree of interference between the "teeth" constituted by the discontinuous rib and the exterior of an inserted pipe.

The number of interruptions or discontinuities in the discontinuous rib may vary but experience shows that optimum pipe retention is usually achieved if there are interruptions such that the rib is divided circumferentially into teeth that each subtend an angle in the range 10° – 20° at the axis.

In addition to the discontinuous rib, the connector body must have at least one continuous rib that will uniformly press upon a ring of the exterior of an inserted pipe to form a seal against fluid leakage. Depending upon the nominal size of the pipe and the pressures to be sustained without leakage, the connector body may be provided with two, three or even more continuous ribs which may all be of the same profile and diameter of defined aperture or which may vary in profile and/or in diameter of defined aperture so that at least one such rib will be adapted to develop optimum sealing relationship with the exterior of a selected one of a range of pipes having differing external diameters within a specified range of tolerances. Preferably, in such a case, the successive ribs spaced from the orifice entry define apertures of progressively decreasing diameter.

In preferred embodiments of the invention, the connector body has two pairs or sets of ribs, each pair or set including a discontinuous rib, respectively adapted for optimum securement and sealing engagement with pipes of two external diameters, for instance the limits of tolerance for one nominal external diameter or the nearest equivalents in two standards of measurement, e.g. Imperial and Metric sizes.

It is desirable to provide between each rib, whether continuous or discontinuous, and its neighbour a recess of diameter greater than the nominal external diameter of the pipe so as to provide for expansion of the pipe to its full diameter or more between regions engaged by the adjacent ribs. For the same reason, the inter-rib spacing should be such as to permit such pipe expansion, taking account of the characteristics of the pipe material and its wall thickness.

The cone angle of the ramped divergent surface(s) in the connector body is most critical in the case of connectors for small nominal external diameter pipes, a cone angle that is either too large or too small preventing easy passage of the pipe end through the aperture following the ramped surface. A cone half-angle in the range 5°–15°, preferably about 10°, is usually most suitable, but cone half-angles up to 30° or more may be adopted in some cases.

The invention will be further explained with reference to the accompanying drawings which illustrate certain embodiments by way of example. In these drawings:

FIG. 3 is an axial half-section, on a much enlarged scale, of another connector body embodying the invention.

DETAILED DESCRIPTION OF INVENTION

In the connector in accordance with the invention, the connector body may be of simple tubular form and some embodiments in this form may be double-ended so that a pair of pipes may be connected together by being inserted into opposite ends of such a connector body. In other embodiments the connector body may be formed as a manifold with aplurality of internally interconnected orifices adapted to receive individual pipes of a set so as to interconnect these.

The connector body may, moreover, be integrally formed with the body or structure of some fluid-using, fluid-controlling or fluid-dispensing device or apparatus to which a pipe is to be connected. However, often it will be more convenient to form the connector body as a tubular insert adapted to be secured in an aperture in the body of some device or apparatus to which a pipe connection is required and the drawings show embodiments in this form. Such an insert may be secured and sealed in such a body aperture in any appropriate manner having regard to the respective materials of construction and the configuration of the device or apparatus in the region of said aperture therein, and to facilitate assembly and to accommodate tolerances in the formation of the apparatus body aperture and the connector body insert, the external surface 1 of the insert may, as shown, be formed with one or more circumferential ramped ribs 2 (of the same or of graded external diameter in the case of plural rib configurations) adapted to deform or otherwise sealingly engage with the internal surface of a body aperture into which such insert is fitted.

Figure 1:
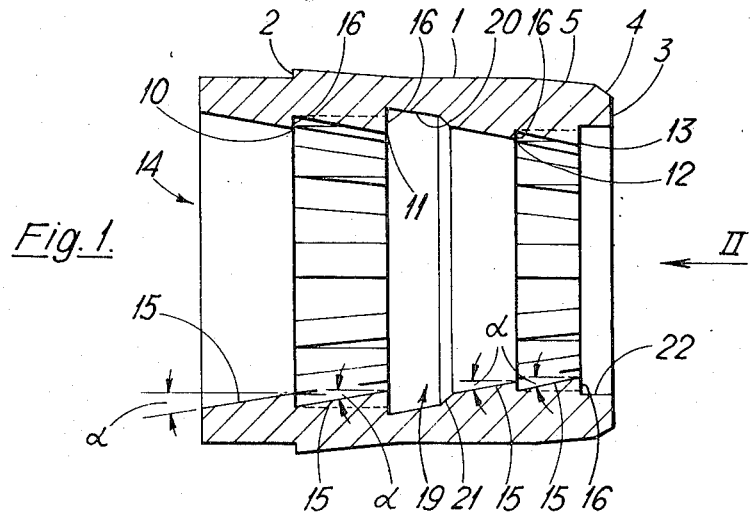
FIG. 1 is an axial sectional view of a connector body constituting one embodiment of the invention.
Figure 2:
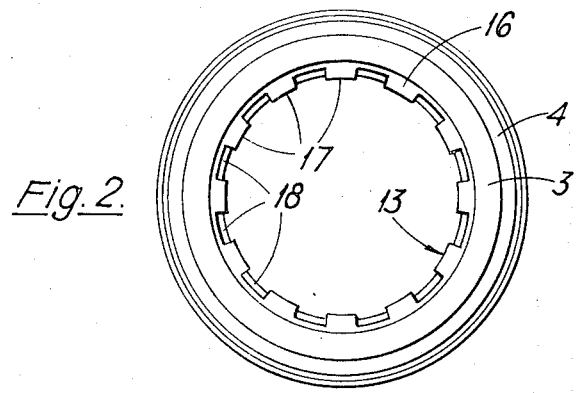
FIG. 2 is an end view of the connector body of FIG. 1, as seen in the direction of arrow II in that Figure.

Referring now to the embodiment illustrated in FIGS. 1 and 2, the connector body defines an orifice having two pairs of internal circumferential ribs designated 10, 11 and 12, 13 respectively. The entry 14 of the body is to the left as seen in FIG. 1 and each of the ribs 10 to 13 has, on its side facing the entry 14, a ramped divergent surface 15. The ribs 11 and 13 are circumferentially interrupted or discontinuous (see FIG. 2) and define clear apertures that are slightly smaller in diameter than the apertures defined by the respectively associated ribs 10 and 12. The righthand or rear faces 16 of all the ribs 10 to 13 are substantially perpendicular to the axis of the body so that each rib has a sharp edge defined by the intersection of surfaces 15 and 16. In this embodiment, the surfaces 15 are inclined at an angle $\alpha$ of about 10° to the body axis (that is, the surfaces 15 are frusto-conical of cone half-angle about 10°) and have a length such as to provide, behind each rib, a recess of diameter greater than the nominal external diameter of the pipe to be engaged by the rib.

The ramped divergent surface, such as the surface 15, forming the entry face of a rib in a connector body will normally be frusto-conical with a cone angle determined by the physical properties of the material of the pipe to be received by the connector body. Thus in the case of a connector body intended to receive a pipe of material of high friction co-efficient, the cone angle of the surface 15 would preferably be somewhat smaller than in the case of a connector body intended for use with pipes of material of low friction co-efficient. It will of course be understood that the smaller the cone angle of such a surface, the greater must be the axial length of such surface in order to extend to the required diameter, with the result that the said cone angle and the number of ribs and, where significant, the minimum inter-rib spacing for pipe expansion as hereinafter discussed, will jointly determine a minimum overall length for the connector body: in some instances a compromise as to the optimum number of ribs or the optimum cone angle may be necessary in order to achieve an acceptable overall length of the connector body for a particular installation.

The embodiment of FIGS. 1 and 2 is intended for receiving pipes of either of two different sizes, for instance Imperial and Metric nominal equivalents such as pipes of respectively, 0.25 inch and 6 mm nominal OD or of OD sizes between these nominal equivalents. Thus, for instance, the ribs 10 and 11 may be adapted for co-operation with plastics (e.g. nylon) pipes of nominal 0.25 inch OD and respectively define apertures of 0.245 and 0.244 inch with surfaces 15 of projected axial length 0.090 inch. Similarly, the ribs 12 and 13 may be adapted for co-operation with pipes of nominal 6 mm OD and for this purpose respectively define apertures of 0.228 and 0.224 inch with surfaces 15 of projected axial length 0.060 inch. Ribs 10 and 11 so dimensioned provide for effective retention and sealing of nominal 0.25 inch OD pipes within the normal OD tolerances for such pipes, whilst ribs 12 and 13 of the dimensions quoted are suitable for nominal 6 mm OD pipes with the normal tolerances for the same. Since the undersize limit tolerances of a nominal 0.25 inch pipe gives an OD close to the oversize limit for a nominal 6 mm pipe, the two pairs of ribs are effective to retain and seal on all pipes with OD sizes ranging between the undersize limit of a 6 mm nominal pipe and the oversize limit of a 0.25 inch nominal pipe.

As shown in FIG. 2, the rib 13 (and likewise the rib 11) is relieved at 12 equiangularly spaced locations to provide teeth 17 and grooves 18 of approximately equal angular extent, each subtending an angle of about 15° at the axis of the body.

It is important that the degree of interference, that is, the difference between the aperture diameter defined by a rib and the nominal external diameter of the pipe to be engaged thereby, should not be too great, particularly in the case of small pipes having a relatively large wall thickness, since excessive interference appears to result in pipe wall distortion over a substantial pipe length which reduces the sealing effectiveness of a closely adjacent continuous rib such as rib 10 or 12 and also, it seems, prevents rather than assists the teeth 17 of a discontinuous rib such as rib 11 or 13 in forming mating notches in the pipe wall. Thus, contrary to expectations, the discontinuous rib 11 or 13 provides optimum pipe retention at modest degrees of interference that do not compromise the sealing effectiveness of the adjacent associated continuous rib 10 or 12 of the rib pair.

Thus it has been found that by reason of its interruptions, a discontinuous rib such as the rib 11 or 13 is capable even at low degrees of interference of exerting a ring of high local "pressure-spots" around the exterior of a pipe inserted into the connector body, so as thereby to achieve substantial resistance to withdrawal of the pipe, without imposing unduly high resistance to insertion of the pipe into the connector body. As compared with the case of a connector body having a continuous rib equivalent in position, profile and diameter of defined aperture, pipes having a much wider range of external diameter may be inserted into the connector body and be adequately retained therein.

It would appear that the interruptions of the discontinuous rib provide spaces into which the material of the pipe may flow to relieve excess radial inwards pressure exerted by the rib upon the pipe in the case of a pipe of above-nominal external diameter, thereby facilitating the insertion of such a pipe. Moreover the discontinuous rib, by deforming the exterior of an inserted pipe in a discontinuous manner, appears to provide both an enhancement of the grip of the rib upon the pipe to prevent withdrawal thereof and of the resistance of the pipe to rotation about its axis within the connector body.

Between the two pairs of ribs 10, 11 and 12, 13 there is a recess 19 in the connector body, this recess being defined by a surface 20 which may be cylindrical or, as shown, be frusto-conical of half angle up to about 20°, and a step surface 21 which is shown as frusto-conical but which may be perpendicular to the axis, ie. being inclined to the latter at any angle in the range of about 20° to 90°. The purpose of the recess 19 is to receive the end portion of a pipe of OD appropriate for retention and sealing by the rib pair 10, 11, the surface 21 being intended to abut the end of such a pipe and to make its further insertion into the body difficult, if not impossible.

To the rear of the rib 13, the body terminates in a cylindrical bore 22 sized to exceed the maximum OD of a pipe intended to be received by the ribs 12 and 13; in the foregoing example of a connector for pipes of 0.25 inch/6mm nominal OD, bore 22 would have a diameter of about 0.249 inch and an axial length of about 0.030 inch.

As noted, the connector body illustrated is in the form of an insert intended to be fitted in an aperture in the body of apparatus requiring a pipe connection and to this end has its outer surface 1 formed with a rib 2, as explained. To facilitate the fitting of such an insert in a body aperture, the end 3 of the insert is tapered, having for instance a 30° chamfer at the tip 4 of a 5° tapered end section 5.

Referring now to FIG. 3, this illustrates, on a much enlarged scale, the configuration, and proportions of the contours, of a connector body similar to that of FIGS. 1 and 2 but differing from the latter in details, as will appear. In this Figure, parts corresponding with the body shown in FIGS. 1 and 2 have been identified by the same references or derivatives thereof and will not be further described except as to differences in configuration and contour.

Thus in the connector body of FIG. 3, surfaces 15a, 15b, 15c and 15d, corresponding with the surfaces 15 of FIGS. 1 and 2, are disposed at an angle α of about 30° to the body axis whilst to preserve the spacing between ribs 10 and 11, and between ribs 12 and 13, the relevant surfaces 15b and 15d respectively join cylindrical surfaces 23a and 23b. The objective of this different configuration is to ensure adequate clearance behind each rib for expansion of the pipe engaged thereby to a diameter somewhat greater than the nominal OD and for a substantial axial extent from the rib.

As shown, the surface 22 is stepped, a cylindrical surface portion 24 being interposed between the rib 13 and the orifice defined by surface 22.

As in the case of the connector body of FIGS. 1 and 2, that of FIG. 3 is intended to receive pipes of either of two nominal external diameters and a range of bodies having the proportions of FIG. 3 but respectively appropriate dimensions may, for instance, be adapted to receive plastics pipes of a range of Imperial and Metric equivalent sizes: that is, one body may be sized to receive three-sixteenths inch and 4 mm nominal OD pipes, another to receive one-fourth inch and 6 mm nominal OD pipes and others to receive, respectively five-sixteenths inch and 8 mm, three-eighths inch and 10 mm, and one-half inch and 12 mm nominal OD pipes.

Thus, for example, a connector body of this configuration for receiving pipes of three-sixteenths inch and 4 mm nominal OD would typically have the following salient dimensions (in inches):

| Diameters | | Axial lengths of surfaces (projected) | |
|---|---|---|---|
| Rib 10 | 0.1805 0.1785 | 15a | 0.050 |
| Rib 11 | 0.1755 0.1735 | 23a | 0.054 |
| Rib 12 | 0.1485 0.1465 | 15b | 0.025 |
| Rib 13 | 0.143 0.141 | 20 | 0.032 |
| Surface 23a | 0.2085 0.2025 | 15c | 0.048 |
| Surface 20 | 0.2035 0.1975 | 23b | 0.052 |
| Surface 23b | 0.1765 0.1705 | 15d | 0.027 |
| Surface 24 | 0.1710 0.1650 | | |
| Surface 22 | 0.135 | | |

Figure 4:
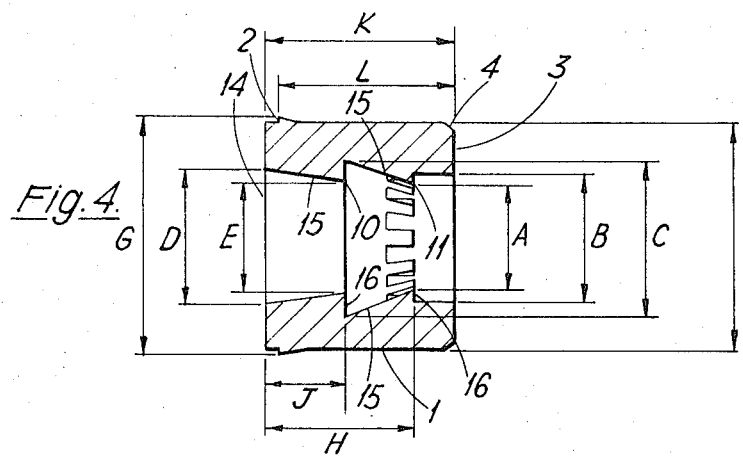
FIG. 4 is an axial sectional view of a further connector body in accordance with the invention.

FIG. 4 illustrates another embodiment of the invention in the form of an insert but having a shorter length than the embodiments of FIGS. 1 to 3 by reason of the fact that it is intended only to receive pipes of a single nominal external diameter, having a single pair of ribs for this purpose.

Thus the insert of FIG. 4 has, like those of FIGS. 1 to 3, a body with an outer surface formed with a ramped rib 2 and an end 3 with a chamfer 4 to facilitate its introduction into an aperture. The bore of the body has two circumferential ribs 10 and 11, the latter discontinuous as in the embodiments of FIGS. 1 to 3, with ramped surfaces 15 on their entry faces and rear faces 16 perpendicular to the axis of the body, The surfaces 15 are inclined to the axis at an angle of about 10° and the salient dimensions, indicated by the letters A to L on the drawing, are given (in inches) in the Table below for two sizes respectively adapted to receive plastics pipes of nominal OD of five-sixteenths inch and one-half inch.

TABLE

| Pipe OD | A | B | C | D | E | F | G | H | J | K | L |
|---|---|---|---|---|---|---|---|---|---|---|---|
| 5/16" | 0.299 0.302 | 0.314 0.317 | 0.314 0.317 | 0.314 0.317 | 0.303 0.306 | 0.622 0.624 | 0.630 0.633 | 0.187 | 0.093 | 0.437 | 0.390 |

TABLE—Continued

| Pipe OD | A | B | C | D | E | F | G | H | J | K | L |
|---|---|---|---|---|---|---|---|---|---|---|---|
| ½" | 0.487 | 0.499 | 0.499 | 0.499 | 0.491 | 0.622 | 0.630 | 0.187 | 0.093 | 0.437 | 0.390 |
|  | 0.490 | 0.502 | 0.502 | 0.502 | 0.494 | 0.624 | 0.633 |  |  |  |  |

It will be noted that in the foregoing Table, some dimensions are shown with tolerance limits that must be observed.

In other embodiments of the invention in which the connector body is formed integrally with the body or structure of some other device or apparatus, it provides for the attachment to the latter of a pipe having a diameter approximating to that of the aperture of the connector body; accordingly in many cases the invention provides the means of connecting relatively large pipes or hoses to components of large fluid-flow capacity that have, nevertheless, a small physical size.

It should further be understood that the security of a connection effected by means of the invention is to some extent at least enhanced by pressure within the pipe since such pressure tends to expand the latter into firmer more sealing-tight, engagement with the connector body.

I claim:

1. A pipe joint connector for connecting to a pipe made of a flexible resilient material, comprising:
   a. a connector body having an orifice with an entry sized to receive a pipe to be connected thereby
   b. at least two axially-spaced sharp-edged circumferential ribs in said orifice each defining an aperture less than the nominal external diameter of said pipe, the ribs being hard relative to said pipe
   c. a ramped divergent surface on the side of each rib facing said orifice entry, said divergent surface extending to a diameter greater than said nominal external diameter of the pipe
   d. at least one of said ribs being interrupted circumferentially leaving projections which discontinuously deform the circumference of the flexible resilient pipe inserted into said orifice.

2. The pipe joint connector of claim 1, wherein said interrupted rib is the rib furthest from the entry to the said connector body orifice.

3. The pipe joint connector of claim 1, wherein said interrupted rib defines an aperture having a smaller diameter than the aperture defined by the other said rib.

4. The pipe joint connector of claim 1, wherein the said interrupted rib is divided into teeth each subtending an angle in the range 10–20° at the axis.

5. The pipe joint connector of claim 1, including a plurality of continuous circumferential ribs within said orifice in addition to said interrupted rib, the successive ribs spaced from the orifice entry defining apertures of progressively decreasing diameter and the interrupted rib being furthest from said entry.

6. The pipe joint connector of claim 1, including two sets of said ribs within said orifice, each said set including an interrupted rib, said sets of ribs being respectively adapted for optimum securement and sealing engagement with pipes of two external diameters.

7. The pipe joint connector of claim 6, wherein a recess of diameter greater than the nominal external diameter of the larger of said pipes is formed in said orifice between said sets of ribs.

* * * * *